UNITED STATES PATENT OFFICE.

JAMES H. HOFFMAN, OF NEW YORK, N. Y.

IMPROVEMENT IN TURN-DOWN ENAMELED PAPER COLLARS.

Specification forming part of Letters Patent No. 45,998, dated January 24, 1865; Reissue No. 2,034, dated July 25, 1865.

*To all whom it may concern:*

Be it known that I, JAMES H. HOFFMAN, of the city, county, and State of New York, have invented a new and Improved Turned-Down or Folded Enameled Paper Collar; and I do hereby declare that the following is a full, clear, and exact description thereof, reference being had to the accompanying drawing, making part of this specification, and giving a view of a folded paper collar with the ends in section.

Ever since the first introduction of turned-down paper collars as an article of usual wear it has been attempted by many persons to make them with an enameled surface; but until my invention such attempts have failed. All such prior attempts, like my own early efforts, failed, for the reason that they attempted to make collars from paper which was enameled for or prepared as if intended for the uses to which enameled paper was usually employed, and from this it always resulted that the enamel, and sometimes both the enamel and paper, was cracked or broken in making the fold. The error which led to all such failures was in attempting to use for a new purpose a material suitably prepared for an entirely different purpose. In the course of my experiments I discovered that it was in vain to attempt to make the required fold for a turned-down collar in paper enameled for other purposes which do not require the making of folds. No amount of care in folding and no appliances could be devised that could prevent the enameled surface from breaking at the fold. After making many unsuccessful efforts and the trial of various compositions for producing the enameled surface, none of which would stretch sufficiently to admit of making the required fold, I finally discovered that the desired result could be obtained by making the coating of enamel very thin, and much thinner than had ever before been applied in making enameled paper, and making or selecting for the purpose paper made of pulp having a very long fiber, and by preference obtained from linen rags.

In the manufacture of the paper from which I make my improved collars I am careful not to reduce the linen stock to a finer pulp than is absolutely necessary for paper of the thickness required, that the fibers may remain long and the body of the paper be uniformly flexible; or I am careful to purchase for my manufacture linen paper having these characteristics—namely, a long fiber and uniform flexibility. Taking paper so made, I moisten and steam it until all its pores, or the spaces between its fibers, are opened to the degree required to receive the composition which constitutes the enamel of the collar when finished. The composition I prefer for this purpose consists of about four parts of blanc fixe, one part of white wax, and a trace of ultramarine, to give the required tint. The blanc fixe, being digested (like the ultramarine) in hot water, and the white wax, being melted, are mixed in about these proportions and stirred thoroughly together until the wax is intimately incorporated with the other materials, and the whole reduced to a thin homogeneous paste, which is now applied warm to the surface of the steamed paper by a brush, or by coating a warm metal plate and then laying the paper, sheet by sheet, upon the plate, and then letting the composition be taken up by absorption from the surface of the plate. Great care must be observed to put on the coating of composition so thin that it will simply cover the surface of the paper, and for that reason I prefer to apply the thin coat of composition with a brush to the surface of a metal plate, from which it is then absorbed by the paper, although it may be applied directly to the paper by a brush. After the paper has been thus coated it is passed between polished heated rollers, under considerable pressure, by which the composition is caused to adhere firmly to the paper and the outer surface highly polished. From paper thus prepared the collars are cut to the required form for ladies or gentlemen, and then folded or turned down. The union of the composition and the paper is so complete and the coating of composition so thin that the fold can be made without breaking or crumbling the enamel—a result never obtained before my said invention.

The collars can be embossed or punched or printed, as desired, as the surface so enameled will receive without injury any desired style of ornament or finish.

What I claim as my invention, and desire to secure by Letters Patent, is—

The new article of manufacture, consisting of a turn-down or folded enameled paper collar, substantially as described.

JAS. H. HOFFMAN.

Witnesses:

S. L. MACOMBER,
G. A. GOLDSMITH.